United States Patent [19]

Kipperman et al.

[11] 4,375,443
[45] Mar. 1, 1983

[54] PROCESS FOR PRODUCING ELECTRICALLY-CONDUCTIVE ARTICLES FROM SILICON POWDER BY TREATMENT IN THE PRESENCE OF BORON OXIDE

[75] Inventors: Antoon H. M. Kipperman, Nuenen; Lambertus E. H. Habraken, Waalre, both of Netherlands

[73] Assignee: Holec N.V., Utrecht, Netherlands

[21] Appl. No.: 190,203

[22] Filed: Sep. 24, 1980

[30] Foreign Application Priority Data

Sep. 26, 1979 [NL] Netherlands .......................... 7907160

[51] Int. Cl.³ .............................................. C04B 35/00
[52] U.S. Cl. ........................................ 264/61; 264/65; 264/66; 501/1
[58] Field of Search ............................ 264/61, 65, 66; 106/73.5; 501/96

[56] References Cited

U.S. PATENT DOCUMENTS

| | | | |
|---|---|---|---|
| 2,419,237 | 4/1947 | Treuting | 423/348 |
| 3,472,667 | 10/1969 | Wagstaff | 106/73.5 |
| 4,040,848 | 8/1977 | Greskovich | 264/65 |
| 4,040,849 | 8/1977 | Greskovich | 264/65 |

FOREIGN PATENT DOCUMENTS

| | | |
|---|---|---|
| 188008 | 3/1904 | Fed. Rep. of Germany . |
| 327171 | 2/1913 | Fed. Rep. of Germany . |
| 2012309 | 7/1979 | United Kingdom . |

Primary Examiner—James H. Derrington
Attorney, Agent, or Firm—Watson, Cole, Grindle & Watson

[57] ABSTRACT

A process for the preparation of shaped, electrically conductive articles from silicon powder by sintering the powder while it is being pressed or sedimented in a mould at a temperature of 1150°–1250° C. in an inert atmosphere and in the presence of boron oxide, optionally followed by adding a further amount of boron into the sintered shaped article. The boron oxide, which is used in an amount of 0.1–11% by weight, based on the silicon powder, can be added in the form of an aqueous solution.

5 Claims, No Drawings

PROCESS FOR PRODUCING ELECTRICALLY-CONDUCTIVE ARTICLES FROM SILICON POWDER BY TREATMENT IN THE PRESENCE OF BORON OXIDE

BACKGROUND OF THE INVENTION

1. Field of the Invention

The present invention relates to a process for the preparation of shaped, electrically conductive articles from silicon powder by sintering the powder while being pressed or sedimented in a mould.

2. The Prior Art

Silicon powder while being can be sintered by heating the powder pressed or sedimented in a mould to sufficiently close to the melting point. For silicon a temperature of 1370°–1405° C. is necessary at a given melt temperature of 1410° C. (internal report, Technical University of Eindhoven, January 1976, from J. Krop; C. Greskovich and J. H. Rosolowski, J. Am. Ceramic Society, 59, 336–343 (1976)). When, however, the powder particles are very fine, i.e., <0.2 μm, at temperatures from 1250° C. sintering phenomena can be already observed. At higher temperatures, namely above 1390° C., larger particles of up to 3 μm can be sintered after addition of boron (see U.S. Pat. Nos. 4,040,848 and 4,040,849).

Contrary to many other substances which show sintering phenomena at much lower temperatures with respect to the melting point, the covalent character of silicon must be considered responsible for the necessary high temperature and the required very fine particles. The preparation of the electrically-conductive shaped articles by sintering of silicon powder is under these conditions hardly interesting because:

1. there are no direct ways to increase the electrical conductivity during the process, which may be necessary for their use as carriers for semi-conductive elements;
2. the fineness of the powder, necessary so that it can be sintered at lower temperatures, requires a special treatment and the powder obtained is difficult to handle;
3. when using less fine powder (>0.2 μm) the total shaped article has to be brought to the required high temperature; this is difficult to realize without the occurrence of local melting phenomena.

A process has now been found wherein the sintering can be carried out as well with coarser powder (>0.2 μm) at lower temperatures in such a way that melting phenomena do not occur, wherein ordinary ovens employing Kanthal-winding (Kanthal is an iron alloy) can be used, wherein a fine porous structure, i.e., as fine as the starting powder, is obtained, and wherein practically no shrinkage occurs and the electrical conductivity increases.

SUMMARY OF THE INVENTION

According to the invention the powder is sintered at a temperature of 1150°–1250° C. in an inert atmosphere and in the presence of boron oxide, and is optionally further treated so as to take up a further amount of boron.

Because of the presence of the boron oxide, the sintering process is accelerated; the boron oxide is decomposed and boron diffuses into the silicon particle, whereby the electrical conductivity is increased. After sintering a further amount of boron oxide may be added to the shaped article, which after a short time of heating at a temperature of 1200°–1250° C. yields an increase of the electrical conductivity, without resulting in an appreciable coarsening of the structure. This is possible because of the homogeneous porosity of the shaped article.

The invention also relates to a shaped article which has been obtained by using the process according to the invention.

The employed inert gas must be one that does not react with the silicon powder; especially useful are the noble gases, preferably so-called welding argon, which contains about 0.01% by weight of oxygen and less than 1% by weight of nitrogen.

The addition of the boron oxide serves:

1. to take up the oxide skin around the silicon powder particles into the glass-like mixture silicon-boron oxide melting below 1250° C. and press the particles at their points of contact on each other because of the surface tension;
2. to accelerate the sintering process because of the increase of the surface diffusion;
3. to act as a source for the boron diffusion into the silicon particle to increase the electrical conductivity.

The boron oxide dissolves in water as metaboric acid and remains in that form during the drying of the powder as a skin around each particle. After the powder has been pressed or sedimented in the desired form at room temperature, the temperature is increased slowly, so that the metaboric acid passes into boron oxide by losing water, with a part of the metaboric acid escaping as vapor.

The boron oxide is added in an amount of 0.1–11, preferably 1–3% by weight, based on the weight of the silicon powder.

Carrying out the process according to the invention occurs in three steps. In the first or conditioning step the metaboric acid is partly converted into boron oxide; for that the powder, pressed or sedimented in the desired mould, is heated at a temperature of 450°–500° C. for 0.5–2 hours, is sintered at a temperature of 1150°–1250° C. for 1–2 hours (during which the oxide skin is taken up into the silicon-boron oxide-glass layer), and finally held for not more than 24 hours at a 200°–300° C. lower temperature to form a fine porous article, wherein low coarsening of the structure has occurred.

Afterwards a further solution of boron oxide in water can be caused to be sucked into the sintered shaped article, whereafter it is dried, heated at 450°–550° C. for 0.5–2 hours and at 1200°–1250° C. for 1–2 hours. A further like heating after the sintering process is not necessary herein.

The shaped articles obtained by using the process according to the invention can, for example, be used as carrier material for thin silicon layers. In this regard, they have the advantage with respect to other materials that they do not react with the silicon from the thin layer, yet they have the same coefficient of expansion and they have a good heat balancing coefficient with respect to the thin silicon layer. At the same time, they have a high electrical conductivity which allows for a good passage of the electrical current to the silicon element of the silicon layer. The added boron has no hindering influence on the element because it is used as a normal dopant in silicon.

The invention is further explained with the help of the following example.

EXAMPLE

Sintering of flat round pills from silicon powder having boron oxide as accelerator and as source for doping the silicon.

Chemically pure (99.9%) silicon powder having a particle size of 0.5–20 μm was used as a starting material; the form of the particles was arbitrary and jagged.

This powder was washed in a 1% HCl solution to remove the iron impurities from the particle surface. After settlement and pouring off the liquid, 1% by weight of $B_2O_3$, dissolved in water, was added and the mixture was dried until a dry powder is obtained.

From this powder round pills were pressed in a hard steel mould under a pressure of 9000–10000 $N/cm^2$. These had a diameter of 15 mm and a thickness of about 1.5 mm. The pills had a density of 50–55%.

The pressed pills were placed in an oven on a plate of quartz glass in an atmosphere of welding argon. The pills were heated for 1 hour at 500° C. to convert the metaboric acid into boron oxide, subsequently heated for 1 hour at 1230° C. to form the silicon-boron oxide-glass layer and to start the boron diffusion into the silicon to increase the conductivity; thereafter heating was continued for 16 hours at 930° C., whereafter the desired sintering effect was reached, producing a fine porous, mechanically firm and electrically conductive pill.

The break strength of the so sintered pills according to the three point support and central force was 10 $N/mm^3$, and the specific electrical resistance was 0.01–0.03 Ωcm.

Further the pills could be treated to decrease the specific resistance by causing a solution of 1% by weight of boron oxide to be sucked into the sintered pills, by drying the pills, by heating the pills for 1 hour at 500° C. to recover the boron oxide from the metaboric acid, and heating for 2 hours at 1230° C. to saturate the silicon with boron. The result was a decrease in the specific electrical resistance to 0.003 Ωcm and an increase in the break strength to 14 $N/mm^3$.

We claim:

1. A process for producing a shaped, electrically-conductive silicon-containing article which comprises the steps of
   (a) coating particles of a silicon powder with boron oxide,
   (b) moulding at an elevated pressure the coated particles of silicon powder from step (a) into an intermediate article of the desired shape, and
   (c) sintering the shaped article of step (b) in an inert atmosphere by heating the shaped article to between 450° and 550° C. and maintaining this temperature for between 0.5 and 2 hours, then heating the shaped article to between 1150° and 1250° C. and maintaining this temperature for between 1 and 2 hours and finally subjecting the shaped article to a temperature which is between 200° and 300° C. less than the last-mentioned temperature range and maintaining this temperature for up to 24 hours to form the desired shape, electrically-conductive silicon-containing article.

2. The process as claimed in claim 1, wherein in step (a) the particles of silicon powder are coated with an aqueous solution of boron oxide and thereafter dried.

3. The process as claimed in claim 1, wherein the boron oxide is used in an amount of 0.1 to 11% by weight, based on the weight of the silicon powder.

4. The process as claimed in claim 1, wherein the inert atmosphere in step (c) consists of inert gas welding argon.

5. A process for producing a shaped, electrically-conductive silicon-containing article which comprises the steps of
   (a) coating particles of a silicon powder with boron oxide,
   (b) moulding the coated particles of silicon powder from step (a) into an intermediate article of the desired shape,
   (c) sintering the shaped article of step (b) at a temperature of 1150° to 1250° C. in an inert atmosphere to form the desired shaped, electrically-conductive silicon-containing article,
   (d) treating the shaped article of step (c) with an aqueous solution of boron oxide,
   (e) drying the shaped article of step (d),
   (f) heating the shaped article of step (e) to between 450° and 550° C. and maintaining this temperature for between 0.5 and 2 hours, and
   (g) heating the shaped article of step (f) to between 1200° and 1250° C. and maintaining this temperature for between 1 and 2 hours.

* * * * *